Jan. 14, 1964
C. G. TAYLOR
3,117,746
LIFT-PROPULSION DEVICE FOR AIRCRAFT
Filed March 6, 1961
3 Sheets-Sheet 1
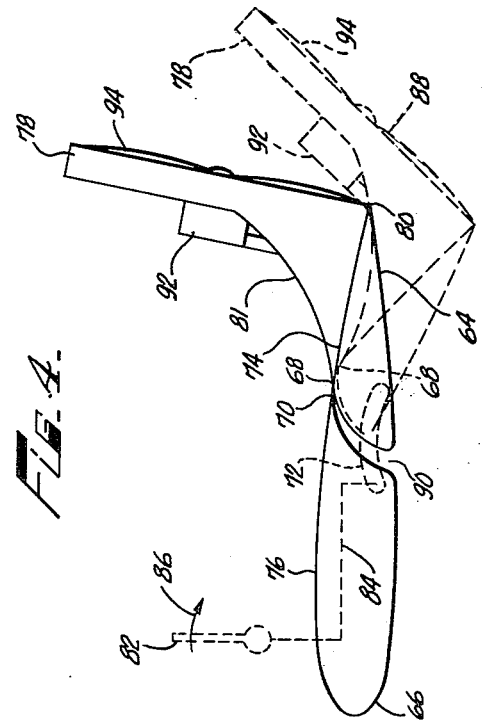
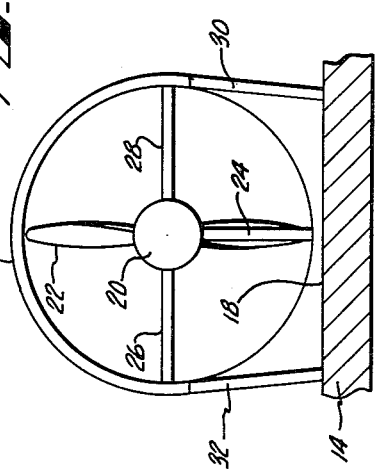
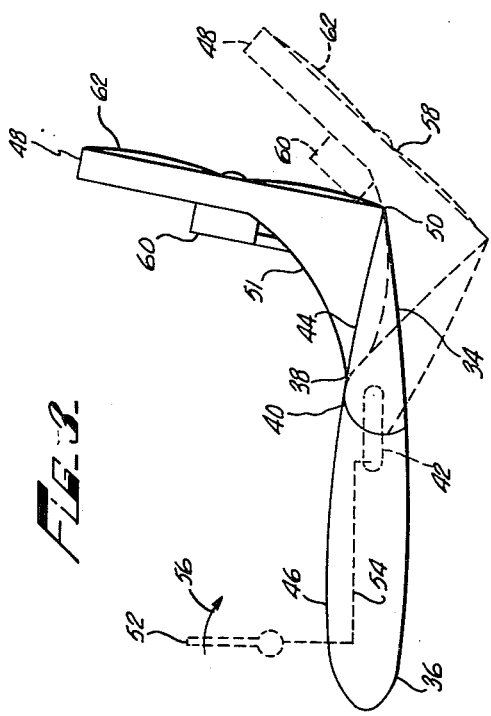
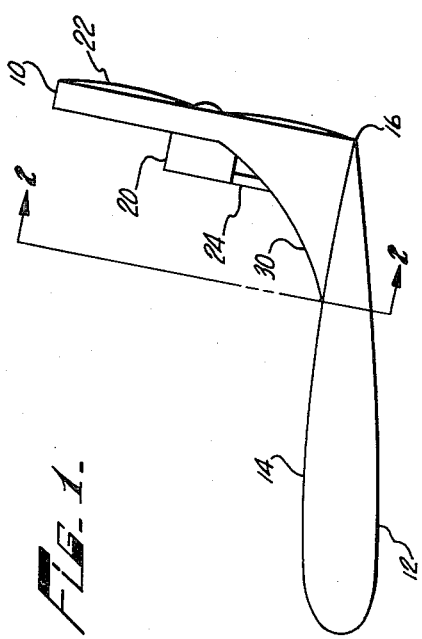
INVENTOR.
CLARENCE GILBERT TAYLOR
BY Christie, Parker & Hale
ATTORNEYS.

Jan. 14, 1964  C. G. TAYLOR  3,117,746
LIFT-PROPULSION DEVICE FOR AIRCRAFT
Filed March 6, 1961  3 Sheets-Sheet 2
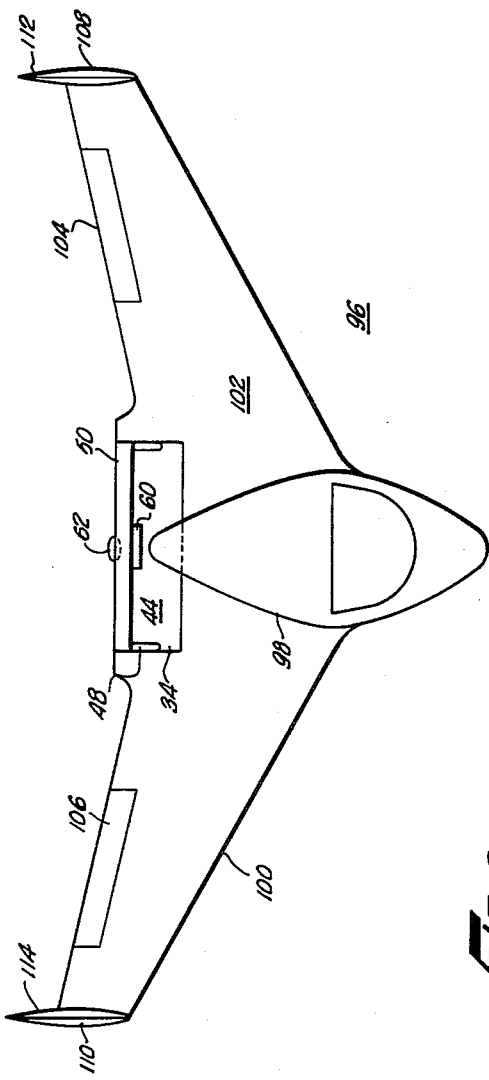
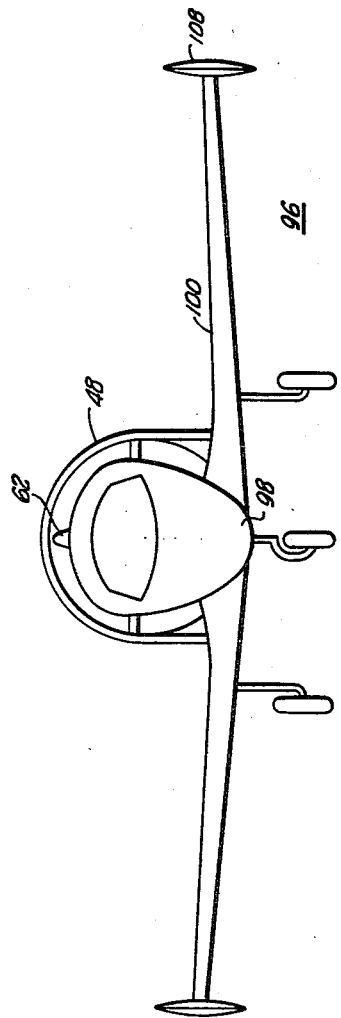
INVENTOR.
CLARENCE GILBERT TAYLOR
BY
Christie, Parker & Hale
ATTORNEYS.

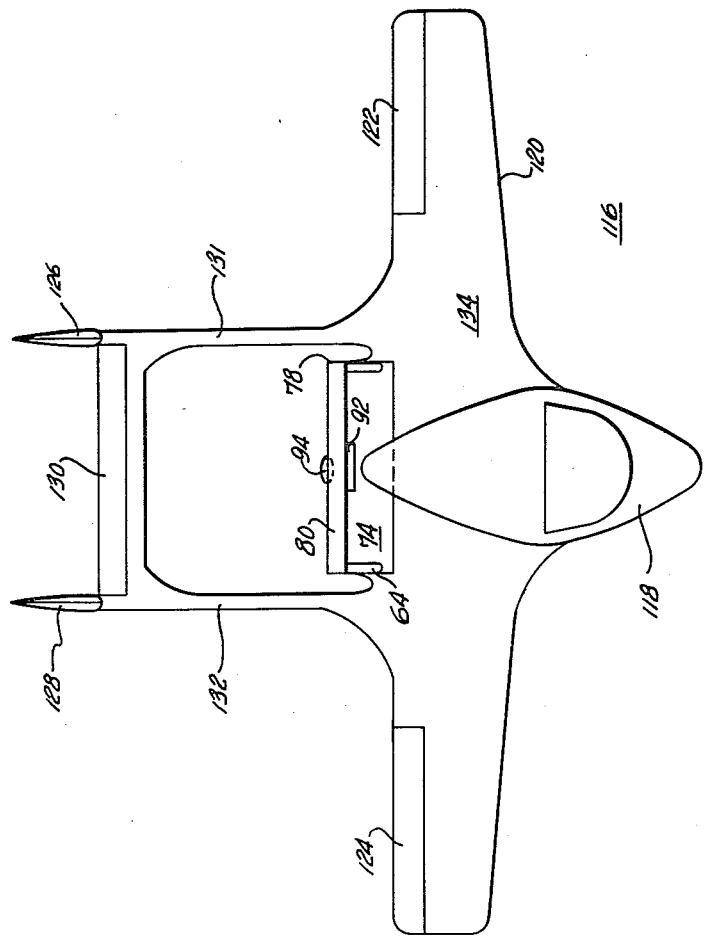

United States Patent Office 3,117,746
Patented Jan. 14, 1964

3,117,746
LIFT-PROPULSION DEVICE FOR AIRCRAFT
Clarence G. Taylor, Oxnard, Calif., assignor to Products Design, Inc., Oxnard, Calif., a corporation of California
Filed Mar. 6, 1961, Ser. No. 93,543
8 Claims. (Cl. 244—12)

This invention relates to a novel lift-propulsion device for aircraft.

In recent years it has become desirous to provide an aircraft having a high top speed yet requiring a minimum of space for take offs and landings. In order for an aircraft to take off and land in a small space it is necessary that the aircraft have a low landing speed. The more efficient aircraft of today generally have a top speed-landing speed ratio of substantially 3.5 to 1. Thus, an aircraft having a top speed of 350 m.p.h. must attain a speed of 100 m.p.h. before it can take off and cannot maintain flight in landing at speeds under 100 m.p.h. Accordingly, such an aircraft requires a substantial space in which to take off and land.

In view of the above, the present invention comprises a novel lift-propulsion device for increasing the lift forces on an aircraft thereby reducing the speed required by the aircraft for take offs and landings.

Basically the lift-propulsion device of the present invention comprises an annular shroud in combination with a main wing of the aircraft. More particularly, the annular shroud is positioned at the trailing edge of the main wing such that the inner lower surface of the shroud forms a smooth continuous surface with the upper surface of the main wing.

By motion of the aircraft or by means (such as a propeller or jet engine) mounted within the shroud, air is drawn over the upper surface of the main wing and through the shroud. The use of the annular shroud not only directs air flow over the upper surface of the main wing to increase the thrust force developed by the engine, but also causes laminar flow of air over the upper surface of the main wing through the annular shroud. Since smooth air flow over the upper surface of the main wing of an aircraft provides substantially 80% of the lift force for the aircraft, the present invention by providing laminar flow over a substantial portion of the upper surface of the main wing materially increases the lift force of the aircraft. Due to the increased lift force the aircraft is capable of taking off and landing at extremely low speeds. Accordingly, by utilizing the lift-propulsion device of the present invention, the top speed-landing speed ratio of the aircraft is substantially increased and the space required for take-offs and landings is substantially reduced.

In a preferred embodiment of the present invention the lift-propulsion device includes a flap member in combination with the main wing of the aircraft. More particularly, the flap member is coupled to the main wing such that the upper surface of the flap member forms a smooth surface with the upper surface of the main wing. In this embodiment of the invention the annular shroud is mounted on the upper surface of the flap member. In particular the shroud is positioned at the trailing edge of the flap member such that the inner lower surface of the shroud forms a smooth continuous surface with the upper surface of the flap member. Accordingly, laminar flow of air is provided over the upper surface of the main wing to the trailing edge of the flap member through the annular shroud to achieve a greatly increased lift force for the aircraft.

In the preferred embodiment of the invention means may be also provided for tilting the flap member relative to the main wing. Due to the position of the annular shroud, laminar flow of air is maintained over the upper surface of the main wing even when the flap member is tilted relative to the main wing. Further, when the flap member is tilted relative to the main wing the thrust force provided by the lift-propulsion device is also tilted at an angle relative to the main wing. The tilting of the thrust force also acts to provide an increased lift force for the aircraft.

In one form, the flap member of the present invention may be coupled to the main wing such that a slot is formed between the main wing and the flap member when the flap member is in tilted position. In this form of the invention, air in addition to being drawn over the upper surface of the main wing and by action of the shroud is also drawn through the slot. The air flow through the slot not only increases the flow of air over the upper surface of the main wing but also maintains laminar flow of air over the upper surface of the flap member when the shroud and flap member are tilted relative to the main wing. Thus the present invention utilizes a tilted thrust force and laminar flow of air over the upper surface of the main wing and flap member to obtain a high lift force at very low air speed.

In the above embodiments of the present invention the lift force provided by the lift-propulsion device is developed at least in part by the laminar flow of air over the upper surface of the main wing. Accordingly it may be desired that only laminar air flow should be allowed over the upper surface of the main wing through the annular shroud. To accomplish this vertical air guide means may be provided in combination with the annular shroud. In particular the vertical air guide means are positioned in front of and are faired into the leading edge of the annular shroud such that air drawn through the shroud only passes over a limited portion of the upper surface of the main wing. Thus air passing over portions of the main wing remote from the shroud which might otherwise be drawn through the shroud and cause turbulent air flow, is prevented from passing through the shroud. Also when the flap is lowered, these vertical guide means prevent air from beneath the wing from being drawn through the shroud.

As previously mentioned, the lift-propulsion device of the present invention may be utilized by aircraft in general. Accordingly, the lift-propulsion device may be used with single or multiple propeller or jet engine aircraft. When utilized in combination with a single propeller or jet engine aircraft, an aircraft design having a particular arrangement for the lift-propulsion device and aircraft fuselage is contemplated by the present invention. In particular, the single engine aircraft includes a main wing laterally coupled to a tailless fuselage. The lift-propulsion device of the present invention is then coupled behind the fuselage of the aircraft. More specifically, the annular shroud having the engine positioned therein is mounted at the trailing edge of the main wing behind the tailless fuselage such that the inner lower surface of the annular shroud forms a smooth continuous surface with the upper surface of the main wing.

In providing the above aircraft design the several embodiments of the lift-propulsion device above may be included. Accordingly, a flap member may be coupled to the main wing behind the tailless fuselage. The annular shroud is then mounted upon the upper surface of the flap member at its trailing edge such that the inner lower surface of the annular shroud forms a smooth continuous surface with the upper surface of the main wing and flap member. Further, as previously described, means may be included for tilting the flap member relative to the main wing. Still further, in tilting the flap member a slot may be formed between the main wing and the flap member to maintain laminar flow of air over the upper surfaces of the main wing and flap member when the flap member is in a tilted position.

The above, as well as other features of the present invention, may be more fully understood by reference to the following detailed description when considered with the drawings wherein like elements are given like reference numerals and in which:

FIG. 1 is a side view of a basic form of the lift-propulsion device of the present invention;

FIG. 2 is a front sectional view of the basic lift-propulsion device of the present invention as illustrated in FIG. 1;

FIG. 3 is a side view of the lift-propulsion device of the present invention including a tiltable flap member;

FIG. 4 is a side view of the lift-propulsion device of the present invention including a preferred form of flap member;

FIG. 5 is a front view of a single engine aircraft utilizing the lift-propulsion device of the present invention;

FIG. 6 is a top view of the aircraft illustrated in FIG. 5; and

FIG. 7 is a top view of an aircraft utilizing the lift-propulsion device of the present invention.

Referring to the drawings there is shown in FIGS. 1 and 2 a side and a front view respectively of the lift-propulsion device of the present invention. As represented, the lift-propulsion device includes, in a basic form, an annular shroud 10 in combination with a main wing 12 of an aircraft, not shown. More particularly, annular shroud 10 is mounted on the upper surface 14 of the main wing 12 at the trailing edge 16. As shown in FIGS. 1 and 2, the annular shroud 10 is so positioned that its inner lower surface 18 forms a smooth continuous surface with the upper surface 14 of the main wing 12.

As previously mentioned, means are included within the annular shroud 10 for drawing air over the upper surface 14 and through the annular shroud 10. This means may take a number of forms. By way of example only, the means for drawing air over upper surface 14 is illustrated as including an engine 20 and an associated propeller 22. As represented, the engine 20 and the propeller 22 are mounted within the annular shroud 10. In particular, the engine 20 is supported within the annular shroud 10 by support members 24, 26 and 28.

With the engine 20 and the propeller 22 in operation, air is drawn over the upper surface 14 of the main wing 12 through the annular shroud 10. The annular shroud 10 acts to direct air flow over the upper surface 14, and through the annular shroud 10. More particularly, the air drawn over the upper surface 14 through annular shroud 10 passes over an extended portion of the leading edge and converges into the shroud. Accordingly, the annular shroud 10 acts as a funnel for air flowing over the upper surface 14, particularly at zero or very low air speeds for the aircraft. It has been found that the funneling action performed by the annular shroud 10 substantially increases the static thrust force normally provided by a combination of the engine 20 and the propeller 22.

Further it has been found that the combination set forth above provides a smooth laminar flow of air over upper surface 14 from the leading edge of the wing and through annular shroud 10 at its inner lower surface 18. As is commonly known, the smooth air flow over the upper surface of a main wing of an aircraft provides substantially 80% of the lift force for the aircraft. In most wing designs laminar flow of air extends only over approximately 30% of the chord distance along upper surface of the main wing. Accordingly, since the present invention provides laminar flow of air drawn through the shroud over substantially 100% of the chord distance from the leading edge to the trailing edge of the upper surface of the main wing, the lift force of the main wing is materially increased.

Thus by use of the present invention as shown in FIGS. 1 and 2, the static thrust force and lift force for an aircraft are both substantially increased by the addition of the shrouded propeller drive at the trailing edge of the wing. Accordingly, an aircraft utilizing the lift-propulsion device of the present invention may take off and land at a relatively low speed thereby requiring a minimum of space for take offs and landings.

As mentioned above, laminar flow of air over upper surfaces 14 of main wing 12 provides the lift force for main wing 12. By extending the laminar flow region back to the trailing edge, the lift force of the wing is materially increased. If the air is drawn over too wide an angle into the shroud, turbulence may be produced. To avoid this, means may be provided in combination with the annular shroud 10 which limits the angular portion of the upper surface 14 over which air is drawn through annular shroud 10. More particularly, these means are represented in FIGS. 1 and 2 as vertical air guides 30 and 32. As shown, the air guides 30 and 32 may form a part of the leading edge of the annular shroud 10. It is the purpose of air guides 30 and 32 to limit the angle over which air is drawn over the upper surface 14 and through annular shroud 10, which if allowed to so flow might disturb the laminar air flow condition. The air guides also prevent air from circulating around the shroud over the lower half of the shroud.

Referring to FIG. 3, there is shown a preferred embodiment of the lift-propulsion device of the present invention. As illustrated, the lift-propulsion device includes a flap member 34 in combination with a main wing 36 of an aircraft, not shown. More particularly, the leading edge 38 of the flap member 34 is coupled to the trailing edge 40 of the main wing 36 by a hinge 42. As shown, the flap member 34 is coupled to the main wing 36 such that the upper surface 44 of the flap member 34 forms a smooth surface with the upper surface 46 of the main wing 36.

As illustrated in FIG. 3, this preferred embodiment of the present invention also includes an annular shroud 48. As shown, the annular shroud 48 is mounted on the upper surface 44 of flap member 34 at the trailing edge 50. More particularly, the annular shroud 48 is so positioned that its inner lower surface forms a smooth continuous surface with the upper surface 44 of flap member 34.

As discussed in connection with FIGS. 1 and 2 it may be desired to include a guide means for limiting the angular portion of the upper surface 46 over which air is drawn through the annular shroud 48. Accordingly as represented in FIG. 3 air guide 51 is provided. As shown the air guide 51 may form a part of the leading edge of the annular shroud 48. As described in connection with FIGS. 1 and 2 air guide 51 functions to limit the angle over which air is drawn over the upper surface 46 and through annular shroud 48, which if allowed to so flow might disturb the laminar air flow condition.

As illustrated in FIG. 3, means are provided for tilting flap member 34 relative to main wing 36. In particular there is provided a lever arm 52 which is positioned within a cabin of the associated aircraft (not shown). As represented by dotted line 54, means are provided for coupling the lever arm 52 to the hinge 42. Accordingly, when lever arm 52 is moved in the direction indicated by arrow 56, the flap member 34 is tilted relative to the main wing 36. At one position of the lever arm 52, the flap member 34 is positioned as illustrated by a dotted line configuration 58.

As represented with the flap member 34 tilted relative to the main wing 36 the air guide 51 performs an additional function. In particular with the flap member 34 in a tilted position the air guide 51 prevents turbulent air flowing under the main wing 36 from being drawn around the side of flap member 34 and through the annular shroud 48 thereby maintaining laminar air flow through the annular shroud 48.

As is further illustrated in FIG. 3, means are provided provide an increase in the thrust force of engine 60 and to provide an increased lift force for main wing 100. Accordingly, aircraft 96 will have an extremely low landing speed and be capable of take offs and landings in a relatively small space.

Referring to FIG. 7, there is shown an aircraft 116 including the lift-propulsion device of the present invention. As represented, aircraft 116 includes a fuselage 118 having a main wing 120 laterally coupled thereto. Main wing 120 includes a pair of ailerons 122 and 124. Aircraft 116, as shown in FIG. 7, further includes a tail assembly. The tail assembly comprises rudders 126, 128 and elevator 130. As shown, the tail assembly is coupled to main wing 120 by support members 131 and 132. Accordingly, aircraft 116 includes the usual means for controlling the path flight of an aircraft having a tail assembly.

As represented in FIG. 7, aircraft 116 includes lift-propulsion device of the present invention. The lift-propulsion device may take any of the forms represented in FIGS. 1, 3 and 4. However, by way of example only, the lift-propulsion device illustrated in FIG. 4 is utilized by aircraft 116. Accordingly, the numbering associated with FIG. 4 is repeated in FIG. 7 to denote the particular elements of the lift-propulsion device. Further, the lift-propulsion device illustrated in FIG. 7 operates in the same manner as that described in connection with FIG. 4. Accordingly, with engine 92 in operation, air is drawn over upper surface 134 of main wing 120, upper surface 74 of flap member 64, through annular shroud 78. This flow of air functions to provide an increased thrust force for engine 92 and to provide an increased lift force for main wing 120. Accordingly, aircraft 116 will have a low landing speed and be capable of take offs and landings in a relatively small space.

In considering the above detailed description of the present invention it is to be understood that the use of an annular shroud does not require any additional means for stabilizing the aircraft. In particular, an annular shroud does not provide a separate lift force. Accordingly, the lift force provided by the lift-propulsion device of the present invention acts in substantial agreement with the lift force of the main wing and does not produce undesirable shifts in the location of the center of lift of the main wing under different conditions. Accordingly, the lift-propulsion device of the present invention may be utilized in aircraft having both straight and V-shaped wings without affecting the stability of such aircraft.

What is claimed is:

1. A lift-propulsion device for an aircraft comprising in combination with a main wing of said aircraft, said main wing including an upper surface and a trailing edge: an annular shroud having an inner lower surface, said annular shroud being mounted on said upper surface of said main wing at said trailing edge such that said inner lower surface of said annular shroud forms a smooth continuous surface with said upper surface of said main wing, the distance between the leading and trailing edge of the shroud being very small compared to the distance between the leading and trailing edge of the wing; air guide means including a pair of substantially vertical members extending between and joining the lower half of the leading edge of the shroud and the top of the wing, the members forming a continuous surface with the top of the wing in front of the shroud and the inner cylindrical surface of the shroud, the air guide means extending toward the leading edge of the wing for directing laminar air flow over a limited portion of said upper surface of said main wing through said annular shroud; and means mounted within said annular shroud for drawing air over said upper surface of said main wing through said annular shroud.

2. A lift-propulsion device for an aircraft comprising in combination with a main wing of said aircraft, said main wing including an upper surface and a trailing edge: a flap member, including an upper surface, a leading edge, and a trailing edge, said leading edge of said flap member being coupled to said trailing edge of said main wing such that said upper surface of said main wing and said upper surface of said flap member form a smooth surface; means for tilting said flap member relative to said main wing; an annular shroud having an inner lower surface, said annular shroud being mounted on said upper surface of said flap member at said trailing edge of said flap member such that said inner lower surface of said annular shroud forms a smooth continuous surface with said upper surface of said flap member thereby allowing laminar flow of air over said upper surface of said main wing through said annular shroud, the distance between the leading and trailing edge of the shroud being very small compared to the distance between the leading and trailing edge of the wing; and air guide means including a pair of substantially vertical members extending between and joining the lower half of the leading edge of the shroud and the top of the wing, the members forming a continuous surface with the top of the wing in front of the shroud and the inner cylindrical surface of the shroud, the air guide means extending toward the leading edge of the wing for directing air flow over a limited portion of said upper surface of said main wing through said annular shroud.

3. A lift-propulsion device for an aircraft comprising in combination with a main wing of said aircraft, said main wing including an upper surface and a trailing edge: a flap member, including an upper surface, a leading edge, and a trailing edge, said leading edge of said flap member being coupled to said trailing edge of said main wing such that said upper surface of said main wing and said upper surface of said flap member form a smooth surface; means for tilting said flap member relative to said main wing; an annular shroud having an inner lower surface, said annular shroud being mounted on said upper surface of said flap member at said trailing edge of said flap member such that said inner lower surface of said annular shroud forms a smooth continuous surface with said upper surface of said flap member thereby allowing laminar flow of air over said upper surface of said main wing through said annular shroud, the distance between the leading and trailing edge of the shroud being very small compared to the distance between the leading and trailing edge of the wing; air guide means including a pair of substantially vertical members extending between and joining the lower half of the leading edge of the shroud and the top of the wing, the members forming a continuous surface with the top of the wing in front of the shroud and the inner cylindrical surface of the shroud, the air guide means for directing air flow over a limited portion of said upper surface of said main wing through said annular shroud extending toward the leading edge of the wing; and means mounted within said annular shroud for drawing air over said upper surface of said main wing through said annular shroud.

4. A lift-propulsion device for an aircraft comprising in combination with a main wing of said aircraft, said main wing including an upper surface and a trailing edge: a flap member including an upper surface, a leading edge, and a trailing edge, said leading edge of said flap member being coupled to said trailing edge of said main wing such that said upper surface of said main wing and said upper surface of said flap member form a smooth surface; means for tilting said flap member relative to said main wing such that a slot is formed between said trailing edge of said main wing and said leading edge of said flap member; an annular shroud having an inner lower surface, said annular shroud being mounted on said upper surface of said flap member at said trailing edge of said flap member such that said inner lower surface of said annular shroud forms a smooth continuous surface with said upper surface of said flap member thereby allowing for drawing air over the upper surface 46 of the main wing 36 through the annular shroud 48. While this means may take different forms, preferably the means includes an engine 60 having a propeller 62 as shown. The engine 60 is mounted within the annular shroud 48.

With the engine 60 and the propeller 62 in operation, air is drawn over the upper surface 46 of the main wing 36, the upper surface 44 of the flap member 34 and through the annular shroud 48. As described in connection with FIGS. 1 and 2, this air flow functions to increase the static thrust force normally provided by a combination of the engine 60 and the propeller 62 and also provides laminar flow of air over the upper surface of the main wing 46 thereby increasing the lift force of main wing 46. When the flap member 34 is in a tilted position, the annular shroud 48 continues to draw laminar flow of air over upper surface 46 of main wing 36 through the annular shroud 48. Accordingly, the increased lift force provided by the present invention is maintained. Further when flap member 34 is in a tilted position, the thrust force of the propeller is directed at an upward angle relative to main wing 36. Accordingly, in the preferred embodiment of the present invention illustrated in FIG. 3, the thrust force provided by the lift-propulsion device aids in providing an increased lift force for the main wing 36. At the same time the main wing 36 can be held in a fairly level altitude. Thus when utilizing the lift-propulsion device of the present invention as illustrated in FIG. 3, it is to be noted that the aircraft associated therewith can climb rapidly when the flap member 34 is tilted relative to main wing 36. When so climbing, the aircraft can nevertheless maintain a position which is level relative to the ground. Accordingly, should the engine fail, the aircraft would still be in a position to glide safely to the ground.

Referring to FIG. 4, there is shown another form of the present invention. As represented, this form of the present invention includes a flap member 64 which is coupled to a main wing 66 of an aircraft, not shown. In particular, the leading edge 68 of the flap member 64 is coupled to the trailing edge 70 of the main wing 66 by a hinge 72. As illustrated, the flap member 64 is so positioned that its upper surface 74 forms a smooth continuous surface with the upper surface 76 of the main wing 66. As is further represented in FIG. 4, this preferred form of present invention also includes an annular shroud 78. As shown, annular shroud 78 is mounted upon upper surface 74 of flap member 64 at trailing edge 80. In particular, annular shroud 78 is so positioned that its inner lower surface forms a smooth continuous surface with upper surface 74 of flap member 64.

As discussed in connection with FIGS. 1 and 2 it may be desired to include air guide means for limiting the angular portion of the upper surface 76 over which air is drawn through the annular shroud 78. Accordingly as represented in FIG. 4 air guide 81 is provided. As shown the air guide 81 may form a part of the leading edge of the annular shroud 78. As described in connection with FIGS. 1 and 2 air guide 81 functions to limit the angle over which air is drawn over the upper surface 76 and through annular shroud 78, which if allowed to so flow might disturb the laminar air flow condition.

As is further represented in FIG. 4, means are included for tilting flap member 64 relative to main wing 66. In particular, there is included a lever arm 82 which is positioned within a cabin of the aircraft associated with main wing 66. As represented by dotted line 84, the lever arm 82 is coupled to the hinge 72. Accordingly, when lever arm 82 is moved in a direction indicated by arrow 86, flap member 64 tilts relative to the main wing 66. For one position of lever arm 82, flap member 64 is positioned as indicated by the dotted line configuration 88. In this embodiment of the present invention when flap member 64 is tilted relative to main wing 66, a slot 90 is formed by the leading edge 68 and trailing edge 70.

As represented in FIG. 4 with the flap member 64 tilted relative to the main wing 66 the air guide 81 performs an additional function. In particular with the flap 64 in a tilted position the air guide 81 prevents turbulent air flowing under the main wing 66 from being drawn around the side of flap member 64 and through the annular shroud 78 thereby maintaining laminar air flow through the annular shroud 78.

To draw air over upper surface 76 of main wing 66 means are provided within annular shroud 78, such as an engine 92 having a propeller 94. As represented, engine 92 is mounted within annular shroud 78.

When the engine 92 and propeller 94 are in operation, air is drawn over the upper surface 76 of the main wing 66, the upper surface 74 of flap member 64, through the annular shroud 78. As previously mentioned in connection with FIGS. 1 and 2, this air flow functions to increase the static thrust force normally provided by the engine 92 and increases the lift force of the main wing 66. Further as described in connection with FIG. 3, when the flap member 64 is tilted relative to the main wing 66, the increased thrust force is directed at an upward angle relative to main wing 66. Accordingly, the thrust force aids in providing an increased lift force for the main wing 66. In the embodiment of the present invention illustrated in FIG. 4, when the flap member 64 is tilted relative to the main wing 66, the slot 90 is formed. Due to the slot 90, air flowing under main wing 66 is drawn through slot 90 over the upper surface 74 of flap member 64. This flow of air functions to maintain laminar air flow over upper surface 74 when flap member 64 is tilted relative to main wing 64. Further, air flowing through the slot 90 is at a high velocity relative to normal air flow. Accordingly, air flowing through the slot 90 over upper surface 74 tends to draw a quantity of air over the lower surface of main wing 66 thereby increasing the lift force for the main wing 66. Accordingly, in this form the present invention utilizes a tilted thrust force and laminar flow of air over upper surfaces 76 and 74 to obtain an increased lift force for the main wing 66.

As previously mentioned, the lift-propulsion device of the present invention may find general use in the field of aircraft design. Thus, the lift-propulsion device may be utilized in combination with the main wing of substantially all aircraft. However, when utilized with a single engine (propeller or jet) aircraft, an aircraft design having a particular arrangement of lift-propulsion device and aircraft fuselage is contemplated. Such an aircraft design is illustrated in FIGS. 5 and 6. As represented, a single engine aircraft 96 includes a tailless fuselage 98 having a main wing 100 laterally coupled thereto. As represented, main wing 100 includes a pair of ailerons or combined ailerons and elevators 104 and 106. Further, positioned at each end of main wing 100 are stabilizing members 108 and 110 respectively. As represented, stabilizing members 108 and 110 include rudders 112 and 114 respectively. Accordingly, aircraft 96 includes the usual means for controlling its flight path.

As shown, the lift-propulsion device of the present invention is positioned to the rear of fuselage 98. As represented, the lift-propulsion device associated with aircraft 96 of FIGS. 5 and 6 may take any of the forms represented in FIGS. 1, 3 or 4, however, by way of example, the lift-propulsion device including a flap member is depicted in FIGS. 5 and 6. Accordingly, the numbering associated with FIG. 3 is repeated to denote the elements of the lift-propulsion device. Still further, a lift-propulsion device will operate substantially as described in connection with FIG. 3. Accordingly, with engine 60 in operating condition, air is drawn over upper surface 102 of main wing 100, upper surface 44 of flap member 34, through annular shroud 48. As represented in FIGS. 5 and 6, air is drawn over upper surface 102 from both sides of fuselage 98. The flow of air over upper surface 102 functions as described in connection with FIG. 3 to laminar flow of air over said upper surface of said main wing through said annular shroud, the distance between the leading and trailing edge of the shroud being very small compared to the distance between the leading and trailing edge of the wing; and air guide means including a pair of substantially vertical members extending between and joining the lower half of the leading edge of the shroud and the top of the wing, the members forming a continuous surface with the top of the wing in front of the shroud and the inner cylindrical surface of the shroud, the air guide means extending toward the leading edge of the wing for directing air flow over a limited portion of said upper surface of said main wing through said annular shroud.

5. A lift-propulsion device for an aircraft comprising in combination with a main wing of said aircraft, said main wing including an upper surface and a trailing edge: a flap member including an upper surface, a leading edge, and a trailing edge, said leading edge of said flap member being coupled to said trailing edge of said main wing such that said upper surface of said main wing and said upper surface of said flap member form a smooth surface; means for tilting said flap member relative to said main wing such that a slot is formed between said trailing edge of said main wing and said leading edge of said flap member; an annular shroud having an inner lower surface, said annular shroud being mounted on said upper surface of said flap member at said trailing edge of said flap member such that said inner lower surface of said annular shroud forms a smooth continuous surface with said upper surface of said flap member thereby allowing laminar flow of air over said upper surface of said main wing through said annular shroud, the distance between the leading and trailing edge of the shroud being very small compared to the distance between the leading and trailing edge of the wing; air guide means including a pair of substantially vertical members extending between and joining the lower half of the leading edge of the shroud and the top of the wing, the members forming a continuous surface with the top of the wing in front of the shroud and the inner cylindrical surface of the shroud, the air guide means extending toward the leading edge of the wing for directing air flow over a limited portion of said upper surface of said main wing through said annular shroud; and means mounted within annular shroud for drawing air over said upper surface of said main wing through said annular shroud.

6. An airplane comprising: a tailless fuselage; a main wing coupled to said fuselage, said main wing including an upper surface and a trailing edge; an annular shroud positioned behind said tailless fuselage and having an inner and lower surface, said annular shroud being mounted on said upper surface of said main wing at said trailing edge such that said inner lower surface forms a smooth continuous surface with said upper surface of said main wing thereby allowing laminar flow of air over said upper surface of said main wing through said annular shroud, the distance between the leading and trailing edge of the shroud being very small compared to the distance between the leading and trailing edge of the wing; air guide means including a pair of substantially vertical members extending between and joining the lower half of the leading edge of the shroud and the top of the wing, the members forming a continuous surface with the top of the wing in front of the shroud and the inner cylindrical surface of the shroud, the air guide means extending toward the leading edge of the wing for directing air flow over a limited portion of said upper surface of said main wing through said annular shroud; and means mounted within said annular shroud for drawing air over said upper surface of said main wing through said annular shroud.

7. An airplane comprising: a tailless fuselage; a main wing coupled to said fuselage including an upper surface and a trailing edge; a flap member positioned behind said tailless fuselage and including an upper surface, a leading edge, and a trailing edge, said leading edge of said flap member being coupled to said trailing edge of said main wing such that said upper surface of said flap member forms a smooth surface with said upper surface of said main wing; means for tilting said flap member relative to said main wing; an annular shroud positioned behind said tailless fuselage and having an inner lower surface, said annular shroud being mounted upon upper surface of said flap member at said trailing edge of said flap member such that said inner lower surface forms a smooth continuous surface with said upper surface of said flap member thereby allowing laminar flow of air over upper surface of said main wing through said annular shroud, the distance between the leading and trailing edge of the shroud being very small compared to the distance between the leading and trailing edge of the wing; air guide means including a pair of substantially vertical members extending between and joining the lower half of the leading edge of the shroud and the top of the wing, the members forming a continuous surface with the top of the wing in front of the shroud and the inner cylindrical surface of the shroud, the air guide means extending toward the leading edge of the wing for directing air flow over a limited portion of said upper surface of said main wing through said annular shroud; and means mounted within said annular shroud for drawing air over said upper surface of said main wing through said annular shroud.

8. An airplane comprising: a tailless fuselage; a main wing coupled to said fuselage, said main wing including an upper surface and a trailing edge; a flap member positioned behind said tailless fuselage and including an upper surface, a leading edge, and a trailing edge, said leading edge of said flap member being coupled to said trailing edge of said main wing such that said upper surface of said flap member forms a smooth surface with said upper surface of said main wing; means for tilting said flap member relative to said main wing such that a slot is formed between said trailing edge of said main wing and said leading edge of said flap member; an annular shroud positioned behind said tailless fuselage and having an inner lower surface, said annular shroud being mounted upon said upper surface of said flap member at said trailing edge of said flap member such that said inner lower surface forms a smooth continuous surface with said upper surface of said flap member thereby allowing a laminar flow of air over said upper surface of said main wing through said annular shroud, the distance between the leading and trailing edge of the shroud being very small compared to the distance between the leading and trailing edge of the wing; air guide means including a pair of substantially vertical members extending between and joining the lower half of the leading edge of the shroud and the top of the wing, the members forming a continuous surface with the top of the wing in front of the shroud and the inner cylindrical surface of the shroud, the air guide means extending toward the leading edge of the wing for directing air flow over a limited portion of said upper surface of said main wing through said annular shroud; and means mounted within said annular shroud for drawing air over said upper surface of said main wing through said annular shroud.

References Cited in the file of this patent

UNITED STATES PATENTS

| | | |
|---|---|---|
| 2,893,661 | Aylor | July 7, 1959 |
| 2,961,188 | Taylor | Nov. 22, 1960 |

FOREIGN PATENTS

| | | |
|---|---|---|
| 985,498 | France | Mar. 14, 1951 |

OTHER REFERENCES

Aviation Week magazine, No. 25, pages 110 and 111, Dec. 19, 1960.

UNITED STATES PATENT OFFICE
CERTIFICATE OF CORRECTION

Patent No. 3,117,746                                              January 14, 1964

Clarence G. Taylor

It is hereby certified that error appears in the above numbered patent requiring correction and that the said Letters Patent should read as corrected below.

Column 8, lines 55 and 56, strike out "extending toward the leading edge of the wing" and insert the same after "means" in line 53, same column 8.

Signed and sealed this 23rd day of June 1964.

(SEAL)
Attest:

ERNEST W. SWIDER                                           EDWARD J. BRENNER
Attesting Officer                                              Commissioner of Patents Attest: